Aug. 18, 1936.   O. WITTEL   2,051,193
CAMERA BACK CONSTRUCTION
Filed July 5, 1935   2 Sheets-Sheet 1
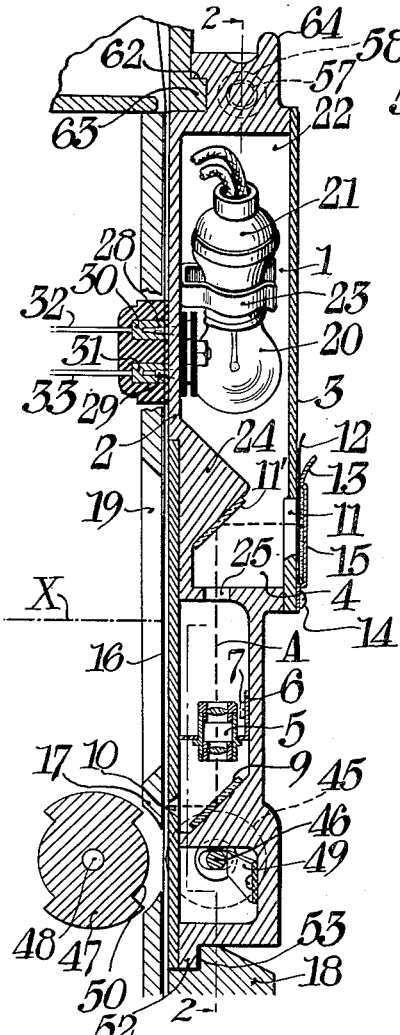
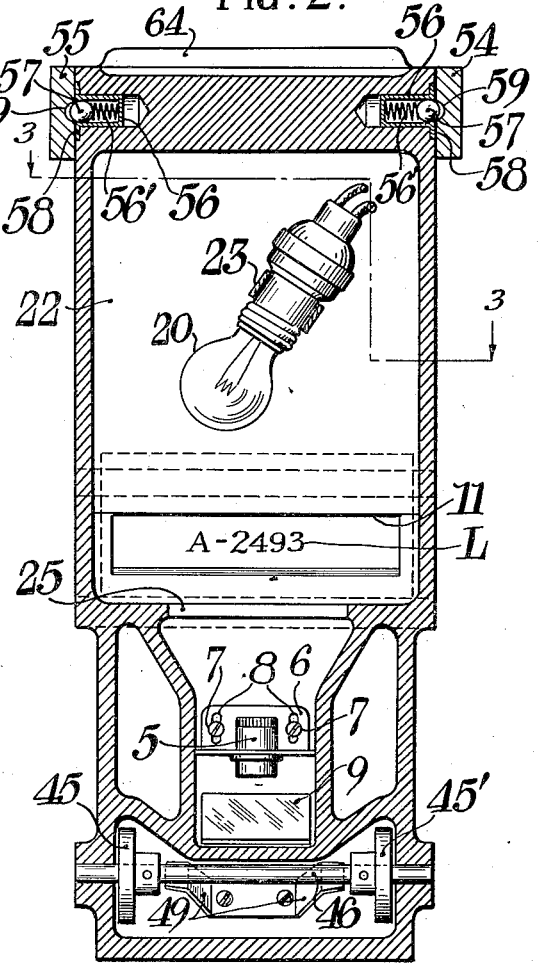
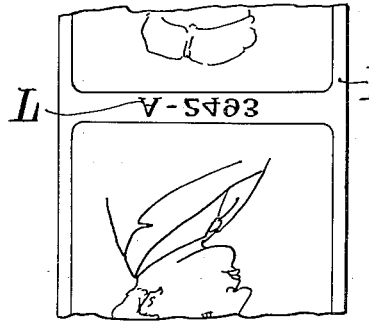
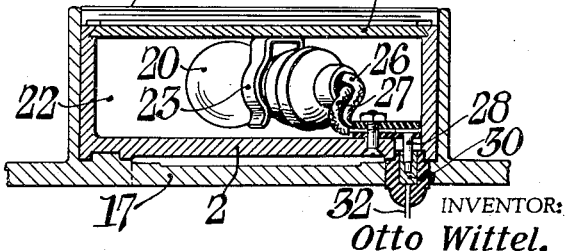
INVENTOR:
Otto Wittel,
BY
ATTORNEYS.

Aug. 18, 1936.  O. WITTEL  2,051,193
CAMERA BACK CONSTRUCTION
Filed July 5, 1935  2 Sheets-Sheet 2

INVENTOR:
Otto Wittel,
BY
ATTORNEYS.

Patented Aug. 18, 1936

2,051,193

UNITED STATES PATENT OFFICE 2,051,193

CAMERA BACK CONSTRUCTION

Otto Wittel, Rochester, N. Y., assignor to Eastman Kodak Company, Rochester, N. Y., a corporation of New York Application July 5, 1935, Serial No. 29,826

8 Claims. (Cl. 95—1.1)

This invention relates to photography and more particularly to photographic cameras. One object of my invention is to provide a camera back particularly adapted for use with cameras designed to make a series of portraits in rapid succession. Another object of my invention is to provide a camera back with a means for identifying the particular exposures made with the camera on which the back is mounted. Another object of my invention is to provide a camera back with an opening into which an identifying slip can be placed and to provide in the camera back a means for photographing data carried by the slip onto the film. Still another object of my invention is to provide a means for automatically spacing the data slip from the film so that it may be accurately focused thereon and to provide a means for producing the correct exposure for the data slip. Other objects will appear from the following specification, the novel features being particularly pointed out in the claims at the end thereof.

In the copending application for photographic cameras Serial No. 28,521, filed June 26, 1935, I have shown a camera adapted to take either single exposures or a plurality of exposures and also to take a series of exposures rapidly if desired. The present invention relates to the camera back used on the camera more fully shown in my copending application.

In cameras adapted particularly for taking portraits it is frequently desirable to take a series of exposures rapidly so that the exposure with the most desirable expression can be used for making the final prints. For taking photographs of children such a camera is particularly desirable. It is also very useful in taking a large number of pictures for school photography and for other purposes, and it is desirable, particularly where a large number of exposures are made on a single film, to identify the individual exposures properly.

With the structure of the camera back which will be hereinafter fully described special provision has been made for definitely photographing identifying data on each individual negative so that when the negatives are developed in strip form the identifying legend will appear on each exposure area.

Coming now to the drawings wherein like reference characters denote like parts throughout:

Fig. 1 is a longitudinal section through a camera back constructed in accordance with and embodying a preferred form of my invention;

Fig. 2 is a section on line 2—2 of Fig. 1;

Fig. 3 is a section on line 3—3 of Fig. 2, with a small portion of the camera shown in section;

Fig. 4 is a fragmentary section illustrating a portion of a film developed to show the identifying data thereon and which illustrates the work accomplished with my improved camera back;

Figure 5:
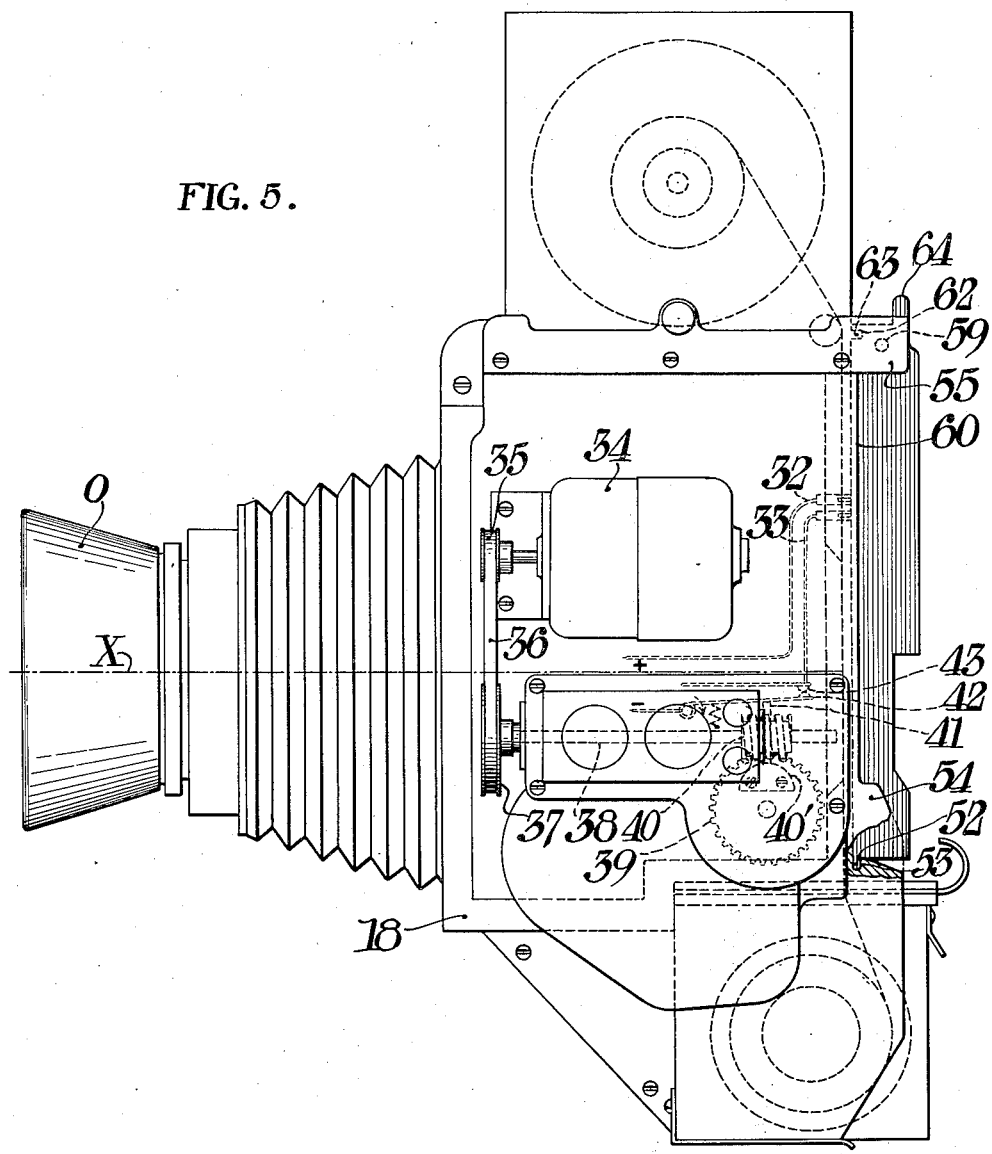
Fig. 5 is a fragmentary side elevation of a portion of the camera to which my camera back may be attached.

In order to provide identifying data to accompany each exposure area I have provided a camera back which may be described broadly as consisting of a hollow or box-like housing containing a miniature camera and an illuminating means. The camera back is likewise provided with an exposure frame and a window so located with regard to the objective that an image at the window may be produced on a film at the exposure frame.

More specifically the camera back shown broadly as 1 in Fig. 1 may be provided with a pair of spaced walls 2 and 3, between which there is an opening or space 4 for supporting a miniature camera.

This camera may consist of an objective 5 mounted upon a slide 6 which can be held in the desired position by means of screws 7 passing through apertures 8. The axis of the objective A is parallel to the camera back 1 but a mirror 9 bends the axis A at right angles so as to pass through a small exposure frame 10.

On the opposite side of the objective 5 there is a mirror 11 for bending the axis so that it may pass through a window 11. The relative position of the objective 5, the exposure aperture 10 and the window 11 is such that an image is formed at the exposure aperture 10 of a legend which may be carried by a card 12 lying against the window 11.

In order to hold a card 12 in position I provide a spring clip 13 which may be attached by screws 14 to the camera back and which may be faced with felt, plush or other light-obstructing fabric 15. A card 12 may be slid down between the spring clip 13 and the back wall 3 so that a legend L such as shown in Fig. 2 may be positioned for exposure. However, when the card 12 is withdrawn, the spring clip 13 with its plush covering 15 forms a lighttight cover for the opening 11.

A film may be drawn down the channel 16 between the side wall 17 of the camera shown in Fig. 5 and designated broadly as 18 so that a section of the film may be positioned across an exposure aperture 19 for receiving an image of the object being photographed. The axis X of the camera objective O normally passes through the center of the exposure frame 19 which defines the size of the picture area.

It is desirable to insure the correct exposure of the legend L and in order to do this I prefer to provide an electric lamp 20 carried by a suitable socket 21 and held in the opening 22 of the camera back by means of a suitable spring clip 23. It is sometimes desirable to paint the walls of the opening 22 white or to silver these walls in order to reflect as much light as possible, although this is not necessary since the wattage of the lamp can be arranged to suit the requirements.

It should be noted that a projection 24 is provided on which the mirror 11 may be mounted. This projection not only provides a mounting for the lamp but together with the frame 25 it tends to mask off direct light from the lamp 20 to the objective 5. Thus, fogging the image by means of light rays passing directly from the lamp to the objective is prevented.

The lamp 20 is connected by means of wires 26 and 27 to a pair of spring plugs 28 and 29 which are adapted to engage complementary shaped sockets 30 and 31, which, in turn, are connected to the wires 32 and 33. The plugs and sockets form a removable connection between the camera back and the camera body.

Referring to Fig. 5 wires 32 and 33 are arranged in a circuit which is automatically controlled by means of a motor 34 in the following manner: a pulley 35, belt 36 and pulley 37 connect the motor to a power-driven shaft 38, this shaft driving a gear 39 through a worm-wheel 40. The gear 39 may be provided with a cam 40' and this cam is so positioned that at each revolution of the gear 39 the plunger 41 will move the contact member 42 upwardly and to contact with the second contact 43, thus, making the lamp circuit.

It is understood that the motor 34 automatically advances the film and operates the camera shutter and that for each of these operations the gear 39 makes one revolution. Consequently, at each revolution of the gear 39 the lamp 20 is momentarily operated and the flash of the lamp correctly exposes the legend L and produces an exposure on the film.

Since the camera back 1 in Figs. 1 and 2 is shown as being provided with a pair of rollers 45 and 45' carried by a shaft 46 it may be pointed out that a film is advanced by means of the advancing rollers 47, carried by the shaft 48 against which the film is resiliently pressed by means of the spring arms 49 which bear upon the shaft 46. The advancing roller 47 is provided with a notched periphery 50 so that while the advancing roller may be continuously rotated the film will be intermittently moved. This structure will not be described further since it forms no part of the invention covered by the present application.

The camera back 1 is provided on its bottom edge with a flange 52 which is adapted to engage a groove 53 in the wall of the camera 18. In order to place the camera back on the camera the flange 52 is engaged in the groove and the camera back may be rocked toward the camera until the side walls thereof pass between the pairs of outwardly extending flanges 54 and 55 of the camera body 18 best shown in Fig. 5. A snap-latch holds the camera back in its closed or operative position. This snap latch consists of a pair of tubular receptacles 56 which carry springs 56' and a ball 57 which is of such a size that it cannot come out of the plate 58. These balls are adapted to snap into recesses 59 in the flanges 55 of the camera body.

As shown best in Fig. 5, the camera back forms a lighttight connection with the camera body since it passes between side rails 60 on the camera body and since there is a flange and groove connection across the bottom of the back shown at 52 and 53 in Fig. 1.

The lighttight connection at the top of the camera is provided by means of the groove 62 on the camera back which receives the flange 63 on the camera body. The up-standing flange 64 serves as a handle for opening the camera back.

As will appear from the above description and drawings I have provided a camera back which can be quickly placed on or taken off a camera, for threading film across an exposure aperture in the usual manner. The camera back is but little thicker than the usual type of back but since it is hollow it is thick enough to receive a miniature camera structure for photographing film identifying data on the back of a film. The front of the camera lies adjacent to an exposure area which is spaced from the aperture through which the legend is photographed on the film. As a result there may appear on the film at the bottom of each exposure aperture data which will enable the photographer to identify each negative. In addition, the exposure of this data can always be correct because the light conditions can be adjusted to suit the particular type of data being photographed upon the film.

Operation of a camera equipped with my improved back is simple in that the operator removes the back and initially threads the strip film across the exposure frame 19 of the camera. The camera back flange 52 is entered in the slot 53 and the back is rocked into engagement with the camera body 18 until the snap latches 57—59 are engaged. This movement not only positions and latches the camera back in an operative position but it causes the contacts 28 and 29 to engage in their respective sockets 30 and 31 so that the circuit of the lamp is completed with the timing mechanism driven by the motor 34.

When a subject is to be photographed, an order slip 12 can be provided with a legend for identifying a particular order or negative. This order slip may be pushed down behind spring clip 13 so that the legend will appear at the window 11. At each cycle of the camera, i. e., each time a fresh exposure area is drawn across the exposure frame 19, the cam 40' through the circuit breakers 42 and 43 momentarily makes the circuit for lamp 20, automatically causing the exposure to be made. There is no shutter for controlling the exposure, this being solely controlled by the flash of the lamp which, in turn, is controlled by means of the cam 40. For each separate order a separate order slip 12 can be used. Thus, there will appear on each negative the order number which will develop up with the image of the object being photographed.

While I have described and illustrated a preferred form of my invention, obviously, many changes can be made in the form of the structure used distinguishing from my invention. I consider as within the scope of my invention all such forms as may come within the scope of the appended claims.

What I claim is:

1. In a camera including a main exposure frame over which film is adapted to be drawn to receive an image of an object to be photographed, the combination with a removable back adapted to cover the exposure frame, said camera back comprising a housing, an exposure aperture and an exposure window, a lens between the window and exposure aperture for forming an image of an object at the window on a film at the exposure aperture.

2. In a camera including a main exposure frame over which film is adapted to be drawn to receive an image of an object to be photographed, the combination with a removable back adapted to cover the exposure frame, said camera back comprising a housing, an exposure aperture and an exposure window, a lens between the window and exposure aperture for forming an image of an object at the window on a film at the exposure aperture, and means in the housing for illuminating the window.

3. In a camera including a main exposure frame over which film is adapted to be drawn to receive an image of an object to be photographed, the combination with a removable back adapted to cover the exposure frame, said camera back comprising a housing, an exposure aperture and an exposure window, a lens between the window and exposure aperture for forming an image of an object at the window on a film at the exposure aperture, and means in the housing for illuminating the window, said means including a lamp and an electric circuit.

4. In a camera including a main exposure frame over which film is adapted to be drawn to receive an image of an object to be photographed, the combination with a removable back adapted to cover the exposure frame, said camera back comprising a housing, an exposure aperture and an exposure window, a lens between the window an exposure aperture for forming an image of an object at the window on a film at the exposure aperture, and means in the housing for illuminating the window, said means including a lamp and an electric circuit, and removable connections between the lamp on the back and the circuit included in the camera.

5. In a camera including a main exposure frame over which film is adapted to be drawn to receive an image of an object to be photographed, the combination with a removable back adapted to cover the exposure frame, said camera back comprising a housing, an exposure aperture and an exposure window, a lens between the window, an exposure aperture for forming an image of an object at the window on a film at the exposure aperture, and means in the housing illuminating the window, said means including a lamp and an electric circuit, and removable connections between the lamp and the back and the circuit included in the camera, said removable connections including cooperating parts in the camera and back adapted to be automatically engaged by placing the back on the camera.

6. In a camera including a main exposure frame over which a film is adapted to be drawn to receive an image of an object to be photographed, the combination with a hollow back adapted to hold film flat over the exposure frame, means comprising an exposure window, an exposure aperture and an objective all located in the hollow camera back for forming an image upon a film held flat on the exposure frame and to one side thereof whereby the first and second mentioned images will lie in spaced relation on the film and whereby the two images may be formed from opposite sides of the film.

7. In a camera including a main exposure frame over which a film is adapted to be drawn to receive an image of an object to be photographed, the combination with a hollow back adapted to hold film flat over the exposure frame, means comprising an exposure window, an exposure aperture and an objective all located in the hollow camera back for forming an image upon a film held flat on the exposure frame, a legend holding clip overlying the exposure window of the camera back and adapted to hold a card flat thereagainst.

8. In a camera including a main exposure frame over which a film is adapted to be drawn to receive an image of an object to be photographed, the combination with a hollow back adapted to hold film flat over the exposure frame, means comprising an exposure window, an exposure aperture and an objective all located in the hollow camera back for forming an image upon a film held flat on the exposure frame, a legend holding clip overlying the exposure window of the camera back and adapted to hold a card flat thereagainst, said legend holding clip including a fabric facing adapted when a card is removed, to form a light tight cover for the exposure window.

OTTO WITTEL.